(12) United States Patent
Omura et al.

(10) Patent No.: US 7,317,608 B2
(45) Date of Patent: Jan. 8, 2008

(54) ELECTRIC DOUBLE LAYER CAPACITOR

(75) Inventors: Seiji Omura, Daito (JP); Hiroshi Nakajima, Hirakata (JP); Yohei Kawata, Hirakata (JP); Mitsuru Shirasaka, Amagasaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/579,721

(22) PCT Filed: Jan. 21, 2005

(86) PCT No.: PCT/JP2005/000766

§ 371 (c)(1),
(2), (4) Date: May 17, 2006

(87) PCT Pub. No.: WO2005/086190

PCT Pub. Date: Sep. 15, 2005

(65) Prior Publication Data

US 2007/0103847 A1    May 10, 2007

(30) Foreign Application Priority Data

Mar. 9, 2004    (JP) .............................. 2004-065494

(51) Int. Cl.
*H01G 9/00*    (2006.01)
(52) U.S. Cl. ...................................... 361/502; 361/503
(58) Field of Classification Search ......... 361/502–503
See application file for complete search history.

(56) References Cited

U.S. PATENT DOCUMENTS 6,301,093 B1   10/2001   Noguchi et al.

2003/0112581 A1 *   6/2003   Kwon et al. ................. 361/502

FOREIGN PATENT DOCUMENTS

| EP | 1 324 360 A2 | 7/2003 |
|---|---|---|
| JP | 1-222426 | 9/1989 |
| JP | 8-222192 | 8/1996 |
| JP | 8-298232 | 11/1996 |
| JP | 11251202 A * | 9/1999 |

OTHER PUBLICATIONS

International Search Report mailed May 10, 2005 of International Application PCT/JP2005/000766.
European Search Report dated Jun. 27, 2007 issued in corresponding European Application No. 05703987.7.

* cited by examiner

*Primary Examiner*—Eric Thomas
(74) *Attorney, Agent, or Firm*—Westerman, Hattori, Daniels & Adrian, LLP.

(57) ABSTRACT

An electric double layer capacitor including a separator, a pair of polarizing electrodes disposed opposite to each other with the separator interposed therebetween, an electrolytic solution impregnated in a pair of the polarizing electrodes and the separator, an exterior cover and an exterior case for accommodating the separator, a pair of the polarizing electrodes, and the electrolytic solution, and a gasket disposed between the outer circumferential part of the exterior cover and the inner circumferential part of the exterior case, the storage space formed by the exterior case and the exterior cover being hermetically sealed by inwardly bending the opening tip portion of the exterior case, is characterized in that no folded-back part is provided at the outer circumferential part of the exterior cover, and the gasket is polyether ether ketone.

4 Claims, 6 Drawing Sheets

⬇ TEMPERATURE INCREASE

⬇ TEMPERATURE DECREASE

FIG. 5 (a) (PRIOR ART)
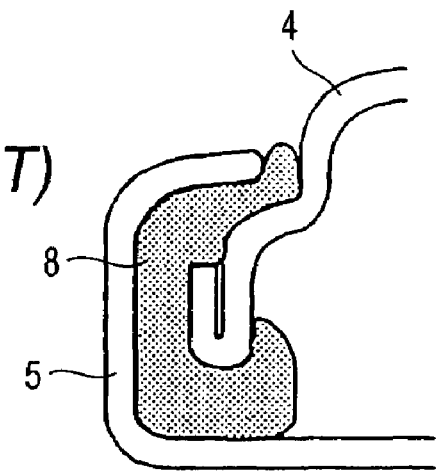
⇩ TEMPERATURE INCREASE
FIG. 5 (b) (PRIOR ART)
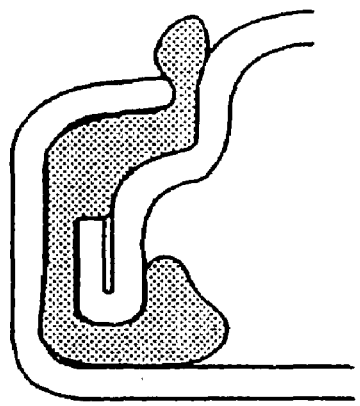
⇩ TEMPERATURE DECREASE
FIG. 5 (c) (PRIOR ART)
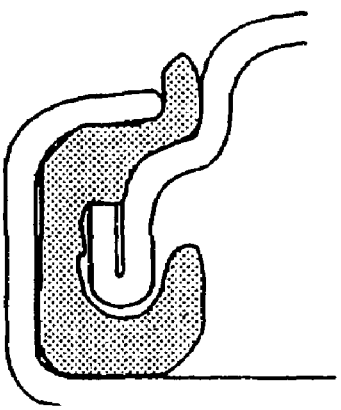

ELECTRIC DOUBLE LAYER CAPACITOR

TECHNICAL FIELD

The present invention relates to an electric double layer capacitor which includes a pair of polarizing electrodes opposite to each other with a separator interposed therebetween, impregnated with an electrolytic solution.

BACKGROUND ART

For an electric double layer capacitor having a coin type structure, the structure as shown in FIG. 6 is generally known. Namely, a first polarizing electrode (1) including an activated carbon or the like and a second polarizing electrode (2) including an activated carbon or the like are disposed opposite to each other with a separator (3) interposed therebetween. Thus, the first polarizing electrode (1) and the second polarizing electrode (2) are provided with a first current collector (6) and a second current collector (7), respectively. A pair of the polarizing electrodes (1) and (2), and the separator (3) are impregnated with an electrolytic solution. The components are accommodated in the storage space formed by an exterior case (5) serving as an anode terminal, and an exterior cover (4) serving as a cathode terminal. A gasket (8) having an electric insulation property is disposed between the inner circumferential part (5a) of the exterior case (5) and the outer circumferential part (4a) of the exterior cover (4). Thus, the opening tip portion (5b) of the exterior case (5) is inwardly bent. As a result, the storage space formed by the exterior case (5) and the exterior cover (4) is hermetically sealed.

The outer circumferential part (4a) of the exterior cover (4) is provided with a folded-back part (4b), which facilitates the application of pressure to the gasket (8), and allows the improvement of the airtightness (see, e.g., JP-A-8-222192).

The electric double layer capacitor as described above is mounted to a printed circuit substrate, or the like as a back-up power source for the memory of portable communication equipment, or the like, to be used. In recent years, the circuit substrate used in electronic equipment such as the portable communication equipment is required to have higher performances, to be more multifunctional, and to be more compact in size. Thus, a large number of electronic components are required to be mounted on the substrate. Under such circumstances, the following reflow soldering technique is used. A cream solder is applied to the portions on the substrate, on which electronic components such as an electric double layer capacitor are mounted. Then, the electronic components are mounted on the cream solder-applied surface, and the substrate is introduced to a reflow furnace. In the reflow furnace, the substrate is heated at a temperature as high as about 230° C. for a short time to melt the solder. As a result, the electronic components are connected to the substrate. In order to cope with such a trend for higher temperatures in the reflow soldering step, polyphenylene sulfide, or the like, excellent in elasticity, formability, and heat resistance is used as the gasket material for an electric double layer capacitor. Whereas, for the reflow soldering, lead-containing solders of a tin-lead system and the like have conventionally often been used.

DISCLOSURE OF THE INVENTION

For the lead-containing solders, lead is a metal having a toxicity. Therefore, use of a lead-free solder not containing lead is strongly desired. Under such circumstances, lead-free solders of a tin-copper system, a tin-silver system, a tin-silver-copper system, a tin-bismuth system, a tin-zinc system, a tin-antimony system, and the like were developed, and such lead-free solders have come into use.

However, while the melting point of the lead-containing solders of a tin-lead system, and the like is about 190° C., the melting point of the lead-free solders of a tin-copper system, a tin-silver system, and a tin-silver-copper system is as high as about 230° C. Therefore, the heating temperature in the reflow furnace is also required to be raised from a temperature of about 230° C. to about 260° C.

When the electric double layer capacitor in the foregoing shape is subjected to a reflow step at about 260° C., due to the difference between the coefficient of thermal expansion of the exterior cover and the exterior case made of a metal such as a stainless steel, and the coefficient of thermal expansion and the thermal conductivity of the gasket (8) such as polyphenylene sulfide, a slight gap is formed between the exterior cover (4) and the gasket (8), or the gasket (8) and the exterior case (5). The electrolytic solution unfavorably leaks therefrom.

A description will be given in details by reference to FIGS. 5A to 5B. An electric double layer capacitor as shown in FIG. 5A is manufactured. When it is heated to 260° C. or more in a reflow furnace, as shown in FIG. 5B, first, the exterior cover (4) and the exterior case (5), made of a stainless steel having a high thermal conductivity, start to thermally expand, and then, the gasket (8) starts to thermally expand. Thereafter, the capacitor is taken out from the reflow furnace, as shown in FIG. 5C, shrinkage starts from the exterior cover (4) and the exterior case (5), and subsequently, the gasket (8) shrinks. Herein, polyphenylene sulfide conventionally used for the gasket (8) has a thermal deformation temperature of as high as about 260° C. Therefore, although it has a certain degree of elasticity, it has a difficulty in holding the adhesion in response to the expansion of the exterior cover (4) and the exterior case (5). This problem remarkably appears with an increase in temperature of the reflow furnace, which causes the leakage of the electrolytic solution. Whereas, the folded-back part (4b) provided at the outer circumferential part (4a) of the exterior cover (4) enlarges the width of the thermal expansion of the exterior cover (4). Therefore, the gap tends to be formed between the folded-back part (4b) and the gasket which shrinks behind the exterior cover (4) and the exterior case (5). This unfavorably tends to cause leakage, In view of the foregoing problems, the invention provides an electric double layer capacitor which is excellent in heat resistance, and is less likely to undergo the leakage of the electrolytic solution even when reflow soldering is carried out at a higher temperature than in the related art.

An electric double layer capacitor of the present invention including a separator, a pair of polarizing electrodes disposed opposite to each other with the separator interposed therebetween, an electrolytic solution impregnated in a pair of the polarizing electrodes and the separator, an exterior cover and an exterior case for accommodating the separator, a pair of the polarizing electrodes, and the electrolytic solution, and a gasket disposed between the outer circumferential part of the exterior cover and the inner circumferential part of the exterior case, the storage space formed by the exterior case and the exterior cover being hermetically sealed by inwardly bending the opening tip portion of the exterior case, is characterized in that no folded-back part is provided at the outer circumferential part of the exterior cover, and the gasket is polyether ether ketone.

By the use of polyether ether ketone which is excellent in heat resistance and has a relatively larger coefficient of thermal expansion than that of a conventional product as a gasket, the difference in coefficient of thermal expansion from a metal such as a stainless steel which is the material for the exterior cover and the exterior case is reduced. Whereas, polyether ether ketone is lower in thermal deformation temperature than other resin materials, and high in heat-resistant use temperature. Therefore, upon the expansion of the exterior cover and the exterior case, it keeps the hermeticity in response to the deformed shape. Whereas, no folded-back part is provided at the outer circumferential part of the exterior cover. This can reduce the range of thermal expansion in the reflow step as compared with conventional products. By these synergistic effects, it is possible to prevent the formation of the gap between the exterior cover and the gasket, or the gasket and the exterior case even in a reflow step at about 260° C. As a result, it is possible to provide an electric double layer capacitor which is less likely to undergo the leakage of the electrolytic solution.

BRIEF DESCRIPTION OF THE DRAWINGS

FIGS. 5A to 5C are each a cross-sectional view of the sealed portion in a reflow step of a conventional electric double layer capacitor.

BEST MODE FOR CARRYING OUT THE INVENTION

Figure 1:
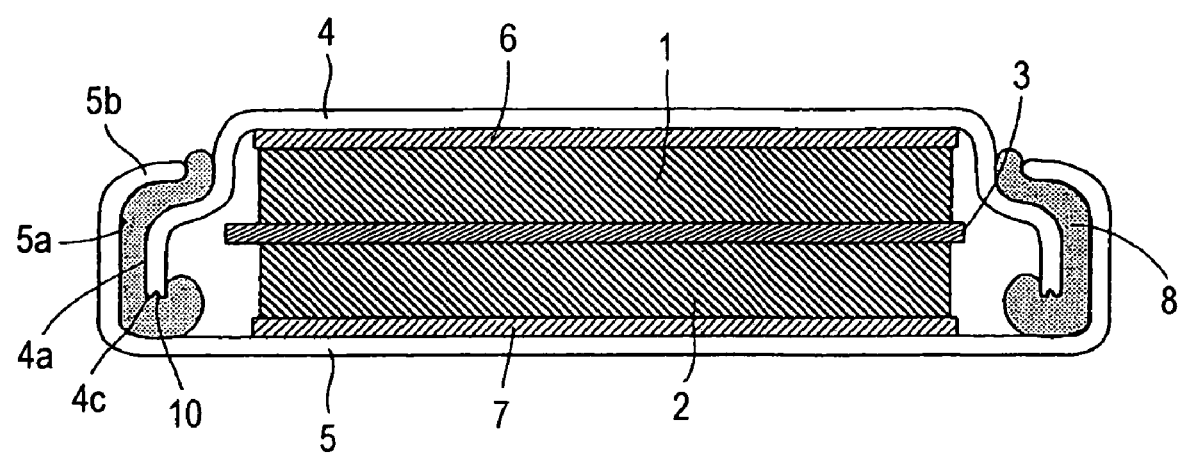
FIG. 1 is a longitudinal cross-sectional view of an electric double layer capacitor in the present invention.

An electric double layer capacitor of the present invention is configured as follows. As shown in FIG. 1, a first polarizing electrode (1) and a second polarizing electrode (2) are disposed opposite to each other with a separator (3) interposed therebetween. Thus, the first polarizing electrode (1) and the second polarizing electrode (2) are provided with a first current collector (6) and a second current collector (7), respectively. Then, a pair of the polarizing electrodes (1) and (2), and the separator (3) are impregnated with an electrolytic solution. The components are accommodated in the storage space formed by an exterior case (5) serving as an anode terminal, and an exterior cover (4) serving as a cathode terminal. A gasket (8) including polyether ether ketone is disposed between the inner circumferential part (5a) of the exterior case (5) and the outer circumferential part (4a) of the exterior cover (4). Thus, the opening tip portion (5b) of the exterior case (5) is inwardly bent. As a result, the storage space formed by the exterior case (5) and the exterior cover (4) is hermetically sealed. The exterior cover (4) used is not provided with a folded-back part at the outer circumferential part (4a).

In the electric double layer capacitor of the invention, the polarizing electrodes (1) and (2) include an active material and a binding agent. When the electric conductivity of the active agent is low, an electric conductive agent may be added thereto. As the active agent, a powdery activated carbon obtained by subjecting sawdust, a coconut shell, a pitch, or the like to an activation treatment can be used. Alternatively, a fiber of phenol type, rayon type, acrylic type, pitch type, or the like is subjected to a curing or carbonization activation treatment, resulting in an activated carbon or an activated carbon fiber. This is made-into a felt form, a fiber form, a paper form, or a sintered form. The resulting one can be used. Other than these, carbon materials such as a carbon nanotube or metal compounds can be used. As the binding agent, a known one commonly used in the electric double layer capacitor can be used. For example, polytetrafluoroethylene, polyvinylidene fluoride, polyvinyl pyrrolidone, polyvinyl chloride, polyethylene, polypropylene, polyfluoroethylene propylene, ethylene-propylene-diene terpolymer, styrene butadiene rubber, carboxymethylcellulose, or fluorocarbon rubber can be used. As the electric conductive agent, a known one commonly used for the electric double layer capacitor can be used. For example, natural graphite such as scaly graphite or earthy graphite, artificial graphite, carbon black, acetylene black, or carbon fiber can be used.

As the separator (3), a resin such as a glass fiber, polyphenylene sulfide, polyethylene terephthalate, polyamide, or polyimide can be used in the form of an insulating film as the one having a large ion transmittance, and having a prescribed mechanical strength. Any pore diameter of the separator (3) is acceptable so long as it falls within the range for those commonly used for a capacitor. For example, those of 0.01 to 5 μm can be used. Any thickness of the separator (3) is acceptable so long as it is commonly employed. For example, those of 10 to 150 μm can be used.

As the electrolytic solution, the one obtained by dissolving a supporting salt in an organic solvent having propylene carbonate is used. However, other organic solvent can be mixed in the propylene carbonate. As the organic solvents, cyclic esters, chain esters, cyclic ethers, chain ethers, and the like are used. Specifically, there can be used at least one or more of ethylene carbonate, butylene carbonate, dimethyl carbonate, diethyl carbonate, γ-butyrolactone, 2-methyly-γ-butyrolactone, acetyly-γ-butyrolactone, γ-valerolactone, 1,2-dimethoxyethane, 1,2-ethoxyethane, diethyl ether, diethylene glycol dialkyl ether, triethylene glycol diethyl ether, ethylene glycol dialkyl ether, diethylene glycol dialkyl ether, triethylene glycol dialkyl ether, tetraethylene glycol dialkyl ether, dipropyl carbonate, methyl ethyl carbonate, methyl butyl carbonate, ethyl propyl carbonate, butyl propyl carbonate, propionic acid alkyl ester, malonic acid dialkyl ester, acetic acid alkyl ester, tetrahydrofuran (THF), alkyl tetrahydrofuran, dialkyl tetrahydrofuran, alkoxy tetrahydrofuran, dialkoxy tetrahydrofuran, 1,3-dioxolane, alkyl-1,3-dioxolane, 1,4-dioxolane, 2-methyl tetrahydrofuran, dimethyl sulfoxide, 1,3-dioxolane, formamide, dimethylformamide, dioxolane, acetonitrile, nitromethane, methyl formate, methyl acetate, methyl propionate, ethyl propionate, phosphoric acid triester, maleic anhydride, sulfolane, 3-methyl sulfolane, and the like. Particularly, the one obtained by mixing sulfolane in propylene carbonate is preferably used because of the excellent heat resistance. As the supporting salt, tetraethylammonium tetrafluoroborate or triethylmethylammonium tetrafluoroborate is preferably used. However, it is also possible to use at least one or more of $(C_2H_5)_4PBF_4$, $(C_3H_7)_4PBF_4$, $(C_2H_5)_4PPF_6$, $(C_2H_5)_4PCF_3SO_4$, $(C_2H_5)_4NPF_6$, $LiClO_4$, $LiPF_4$, $LiBF_4$, $LiN(CF_3SO_2)_2$, and the like.

Whereas, in order to further enhance the sealability of the gasket, it is also possible to coat the gasket with a liquid sealant obtained by, if required, diluting one or more materials of hydrocarbon type ones such as asphalt and butyl rubber, fluorine type oils, chlorosulfonated polyethylene, epoxy resins, and the like, with a solvent.

The thickness of the exterior cover (4) and the exterior case (5) has no particular restriction. However, it is preferably 0.1 to 0.3 mm from the viewpoints of the strength and the outer sizes. Whereas, in the step of hermetically sealing the storage space formed by the exterior case (5) and the exterior cover (4) by inwardly bending the opening tip portion (5*b*) of the exterior case (5), a large load is imposed on the exterior cover (4). For this reason, the thickness of the exterior cover 84) is preferably larger than the thickness of the exterior case (5).

In the exterior cover (4) of a conventional product, the force of the folded-back part to try to unfold by expansion acts, so that the space between the exterior cover and the gasket is expanded by thermal expansion. However in the invention, the exterior cover (4) is formed with a larger thickness than that of the exterior case (5). As a result, it becomes possible to prevent the leakage due to the thermal expansion while reinforcing and keeping the strength.

The exterior cover (4) includes a concave portion (10), into which the gasket (8) goes, formed at the opening tip portion (4*c*). The concave portion (10) usable has been processed in the concave shape in cross section, in the ω form in cross section, in the letter V shape, or in other shape.

When the depth of the concave portion (10) is 5 μm or more the force of the gasket (8) to go into the concave portion (10) further becomes stronger, and the airtightness is further improved. When the depth of the concave portion (10) is larger than 50 μm, the gasket (8) is damaged in the step of inwardly bending the opening tip portion (5*b*), causing cracks. For the reason, the depth of the groove preferably falls within the range of 5 to 50 μm.

The gasket (8) including polyether ether ketone may be used alone. Alternatively, the one obtained by adding a glass fiber, cellulose, elastomer, or the like thereto may be used. Whereas, preferably, the gasket (8) including polyether ether ketone to be used in the invention is previously subjected to a heat treatment at a higher temperature than the heating temperature in the reflow step, i.e., at 260° C. or more. By the heat treatment, the gasket (8) is promoted to be crystallized, and becomes physically stabilized. This can further improve the adhesion between the gasket (8) and the exterior cover (4) and the exterior case (5).

Examples of the invention will be described below.

EXAMPLE 1

An electric double layer capacitor in the invention was manufactured according to the following procedure.

(Manufacturing of Polarizing Electrode)

An activated carbon, acetylene black, and polytetrafluoroethylene were mixed so as to achieve a weight ratio of 90:5:5. The mixture was formed into a disk with a diameter of 2 mm and a thickness of 0.5 mm, and then, vacuum dried at 150° C. for 2 hours thereby manufacturing a first polarizing electrode and a second polarizing electrode.

(Manufacturing of Electrolytic Solution)

In an organic solvent in which propylene carbonate and sulfolane were mixed in a volume ratio of 50:50, triethylmethylammonium tetrafluoroborate which was a supporting salt was dissolved so as to achieve a concentration of 1:0 mol/l; thereby manufacturing an electrolytic solution.

(Fabrication of Coin Type Cell)

Figure 2:
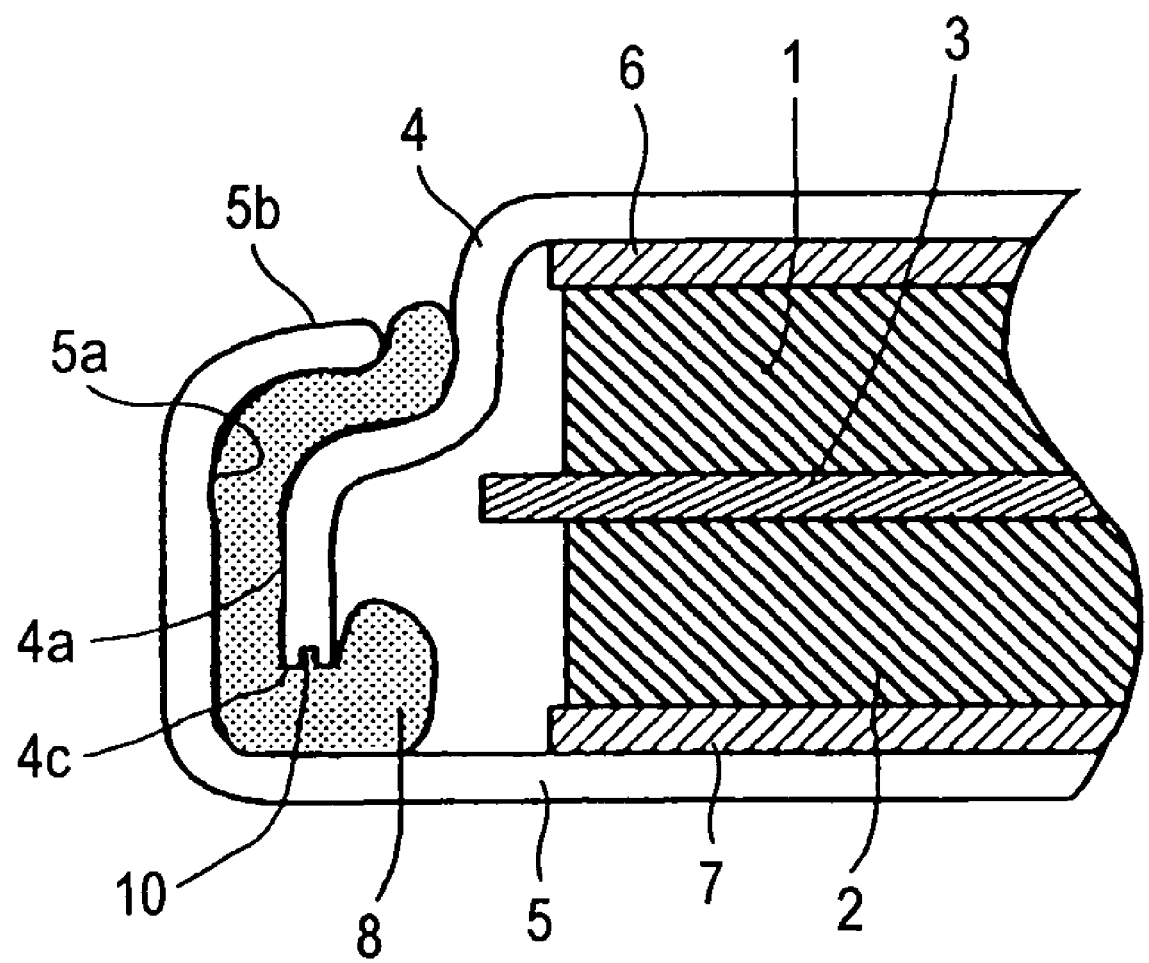
FIG. 2 is a cross-sectional view of the sealed portion of an electric double layer capacitor in Example 1.

As shown in FIG. 2, on the bottom surfaces of an exterior cover (4) not provided with a folded-back part at the outer circumferential part (4*a*), and an exterior case (5), made of a stainless steel, a conductive coating including a graphite powder and water glass mixed therein was coated as each current collector. Then, the first polarizing electrode and the second polarizing electrode were mounted thereon. Incidentally, the exterior cover (4) used had a thickness of 0.2 mm, and the exterior case (5) used had a thickness of 0.15 mm. Then, a separator (3) of a glass fiber containing the electrolytic solution was mounted on the top surface of the second polarizing electrode. On the inner circumferential surface of the exterior case (5), the gasket (8) including polyether ether ketone was mounted. The exterior cover (4) was mounted in the exterior case (5) so that the first polarizing electrode (1) was mounted thereon. Thus, the opening tip portion (5*b*) of the exterior case (5) was inwardly bent. As a result, the storage space formed by the exterior case (5) and the exterior cover (4) was hermetically sealed. Thus, an electric double layer capacitor was manufactured.

COMPARATIVE EXAMPLE 1

Figure 4:
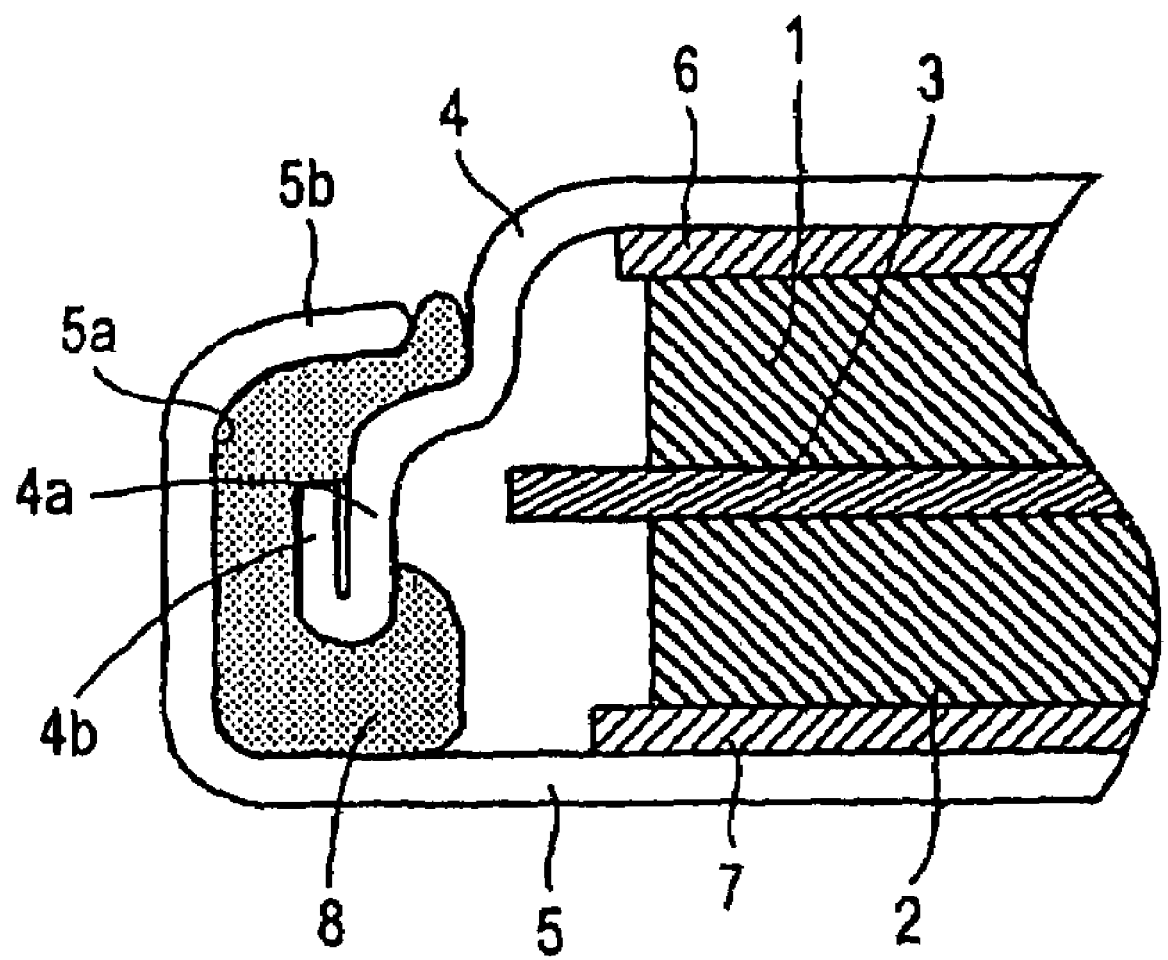
FIG. 4 is a cross-sectional view of the sealed portion of each electric double layer capacitor in Comparative Examples 1 and 3.
Figure 6:
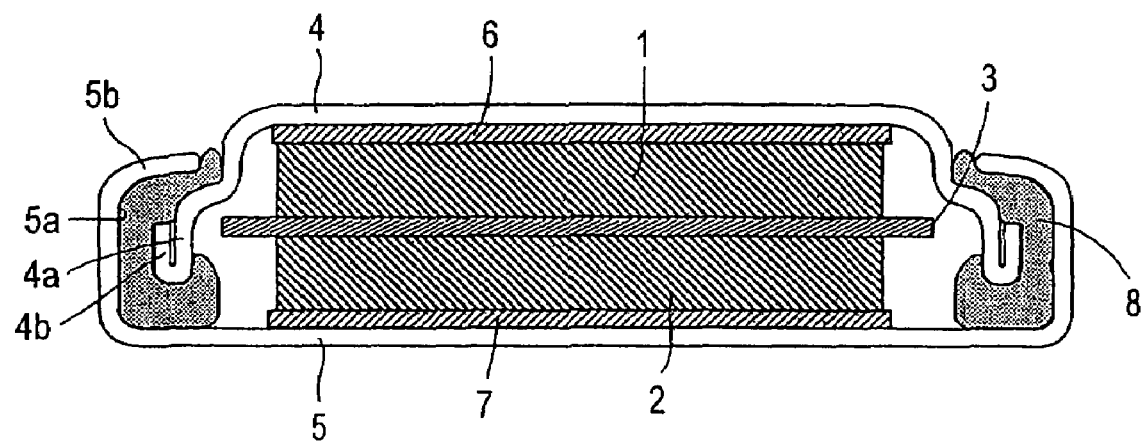
FIG. 6 is a longitudinal cross-sectional view of the conventional electric double layer capacitor.

As show in FIG. 4, an electric double layer capacitor was manufactured in the same manner as in Example 1, except that the exterior cover (4) was provided with a folded-back part at the outer circumferential part (4*a*), and that the exterior cover (4) and the exterior case (5) with a thickness of 0.2 mm were used.

COMPARATIVE EXAMPLE 2

An electric double layer capacitor was manufactured in the same manner as in Example 1, except that polyphenylene sulfide was used as the gasket (8).

COMPARATIVE EXAMPLE 3

An electric double layer capacitor was manufactured in the same manner as in Example 1, except that the exterior cover (4) was provided with a folded-back part at the outer circumferential part (4*a*), that the exterior cover (4) and the exterior case (5) with a thickness of 0.2 mm were used, and that polyphenylene sulfide was used as the gasket (8).

Fifty electric double layer capacitors of each of Example 1, Comparative Example 1, Comparative Example 2, and Comparative Example 3 were manufactured, and allowed to stand in a 260° C. atmosphere for 1 day (24 hours). Then, the leakage of each electrolytic solution was measured. The results are shown in Table 1.

TABLE 1

|  | Number of leakage products |
| --- | --- |
| Example 1 | 0 |
| Comparative Example 1 | 6 |
| Comparative Example 2 | 18 |
| Comparative Example 3 | 21 |

As indicated from the table 1, the electric double layer capacitor of Example 1 in which no folded-back part (4*b*) is provided at the outer circumferential part (4*a*) of the exterior cover (4), and polyether ether ketone is used as the gasket (8), has a higher hermeticity even after loading at high temperatures as compared with Comparative Examples.

The advantages in the invention will be described by reference to FIGS. 3A to 3C.

Figure 3:
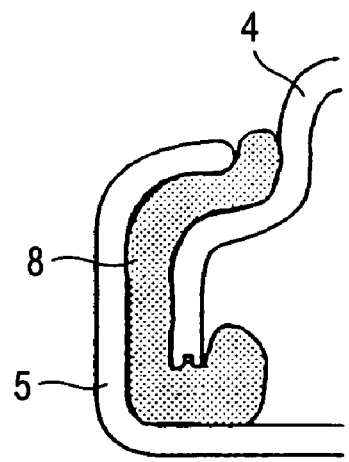
FIGS. 3A to 3C are each a cross-sectional view of the sealed portion in a reflow step of the electric double layer capacitor of the invention.
Figure 3:
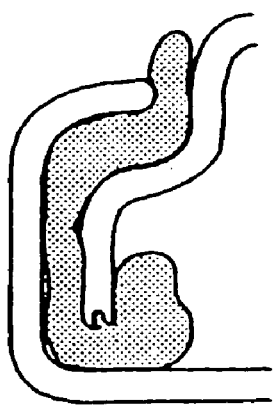
Figure 3:
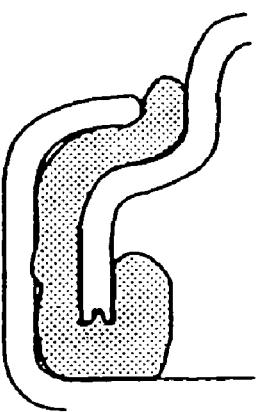

The electric double layer capacitor completed as shown in FIG. 3A was heated to 260° C. or more in a reflow furnace.

Then, as shown in FIG. 3B, first, the exterior cover (4) and the exterior case (5) made of a stainless steel having a high thermal conductivity start to thermally expand, and then, the gasket (8) starts to thermally expand. Thereafter, the capacitor is taken out from the reflow furnace, as shown in FIG. 3C, shrinkage starts from the exterior cover (4) and the exterior case, and subsequently, the gasket (8) shrinks. Herein, the exterior cover (4) is not provided with the folded-back part (4b) at the outer circumferential part (4a). This can reduce the width of the expansion as compared with a conventional one including a folded-back part (4b) provided therein. Whereas, polyether ether ketone to be used as the material for the gasket (8) has a thermal deformation temperature of as low as about 150° C. under a load of 18.6 kg/cm$^2$. Therefore, even when it shrinks behind the exterior cover (4) and the exterior case (5), it has a certain degree of elasticity, and shrinks while adapting to the shape of the exterior cover (4) and the exterior case (5). Therefore, it can keep the adhesion. Whereas, the thermal deformation temperature can be controlled to about 150 to 220° C. by adding a glassfiber, cellulose, elastomer, or the like. Even when the reflow temperature is high, the appropriate adaptation thereof is possible by controlling the amount of the additives.

Whereas, the coefficient of thermal expansion of polyether ether ketone is about 3 times larger than that of polyphenylene sulfide, and close to the coefficient of thermal expansion of the exterior cover (4) and the exterior case (5) made of a stainless steel. For this reason, conceivably, polyether ether ketone tends to adapt to the shape of the exterior cover (4) and the exterior case (5), and can enhance the adhesion as compared with other resins.

By using the technique of forming the concave portion (10) in which the gasket (8) goes into at the opening tip portion (4c) of the exterior cover (4), proposed in Patent Document 1 by the present applicants, it is possible to make larger the polarizing electrodes (1) and (2) than those of the one including the folded-back part (4b) provided at the outer circumferential part (4a) of the exterior cover (4). As a result, it is possible to improve the electrostatic capacitance. In addition, the gasket (8) goes into the concave portion, which can improve the hermeticity.

INDUSTRIAL AVAILABILITY

An electric double layer capacitor in the present invention is mounted to a printed circuit substrate, or the like as a back-up power source for the memory of portable communication equipment, or the like, to be used. Particularly, it is effective when mounted in a reflow step in which it is exposed to a high temperature load using a lead-free solder or the like.

The invention claimed is:

1. An electric double layer capacitor, comprising:
    a separator;
    a pair of polarizing electrodes, disposed opposite to each other with the separator interposed therebetween;
    an electrolytic solution, impregnated in the pair of polarizing electrodes and the separator;
    an exterior cover and an exterior case, accommodating the separator, the pair of polarizing electrodes, and the electrolytic solution; and
    a gasket, disposed between the outer circumferential part of the exterior cover and the inner circumferential part of the exterior case, a storage space formed by the exterior case and the exterior cover being hermetically sealed by inwardly bending the opening tip portion of the exterior case;
    wherein no folded-back part is provided at the outer circumferential part of the exterior cover, and the gasket is polyether ether ketone, wherein the thickness of the exterior cover is larger than the thickness of the exterior case.

2. An electric double layer capacitor, comprising:
    a separator;
    a pair of polarizing electrodes, disposed opposite to each other with the separator interposed therebetween;
    an electrolytic solution, impregnated in the pair of polarizing electrodes and the separator;
    an exterior cover and an exterior case, accommodating the separator, the pair of polarizing electrodes, and the electrolytic solution; and
    a gasket, disposed between the outer circumferential part of the exterior cover and the inner circumferential part of the exterior case, a storage space formed by the exterior case and the exterior cover being hermetically sealed by inwardly bending the opening tip portion of the exterior case;
    wherein no folded-back part is provided at the outer circumferential part of the exterior cover, and the gasket is polyether ether ketone, wherein a concave portion in which the gasket goes is formed in the opening tip portion of the exterior cover.

3. The electric double layer capacitor according to claim 2, wherein the shape of the cross section of the concave portion is any of a concave shape, a letter V shape, and a letter U shape.

4. An electric double layer capacitor, comprising:
    a separator;
    a pair of polarizing electrodes, disposed opposite to each other with the separator interposed therebetween;
    an electrolytic solution, impregnated in the pair of polarizing electrodes and the separator;
    an exterior cover and an exterior case, accommodating the separator, the pair of polarizing electrodes, and the electrolytic solution; and
    a gasket, disposed between the outer circumferential part of the exterior cover and the inner circumferential part of the exterior case, a storage space formed by the exterior case and the exterior cover being hermetically sealed by inwardly bending the opening tip portion of the exterior case;
    wherein no folded-back part is provided at the outer circumferential part of the exterior cover, and the gasket is polyether ether ketone, wherein the gasket has been heat treated at 260° C. or more prior to a reflow step.

* * * * *